April 3, 1951 F. E. VEALE 2,547,350
BACKREST FOR AUTOMOBILES
Filed Oct. 7, 1948
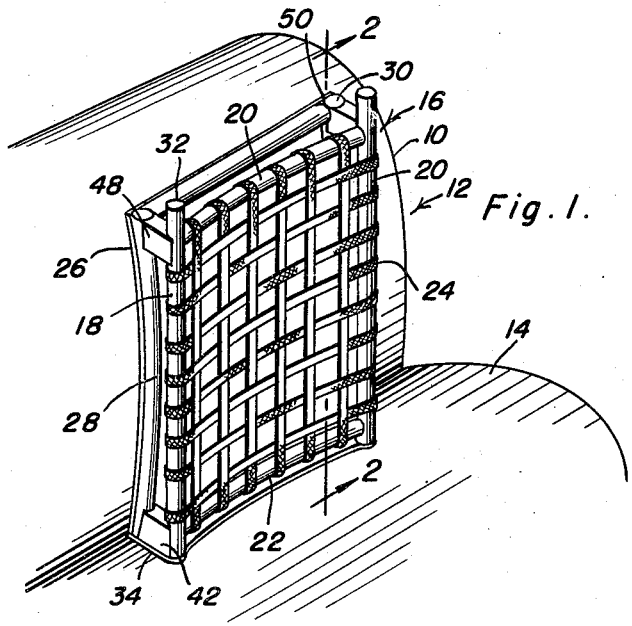
Fig. 1.
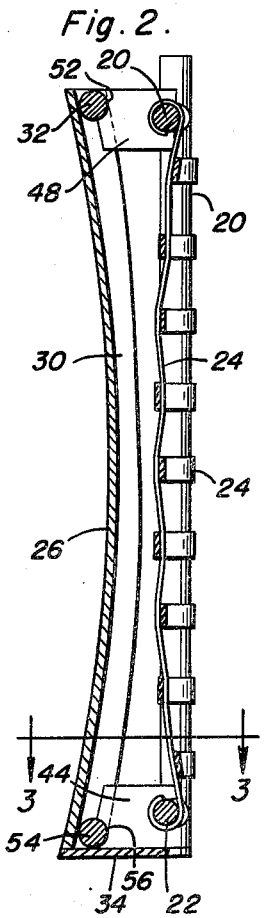
Fig. 2.
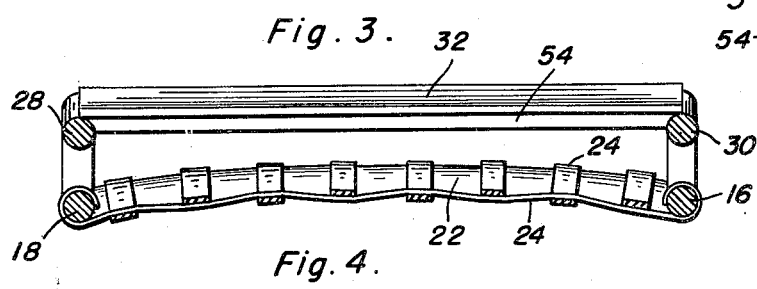
Fig. 3.
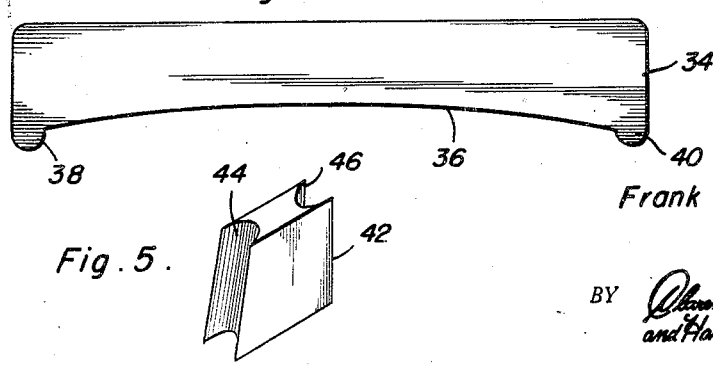
Fig. 4.
Fig. 5.
Frank E. Veale
INVENTOR.
BY *Clarence A. O'Brien*
*and Harvey B. Jackson*
Attorneys Patented Apr. 3, 1951

2,547,350

UNITED STATES PATENT OFFICE 2,547,350

BACK REST FOR AUTOMOBILES

Frank E. Veale, Columbus, Ind.

Application October 7, 1948, Serial No. 53,303

5 Claims. (Cl. 155—182)

This invention relates to a novel backrest to be positioned upon the seat of an automotive vehicle and has for its primary object to eliminate undue perspiration and fatigue while driving the vehicle.

Another object of this invention is to provide a novel backrest designed to keep the occupant away from the back cushion of the seat. To accomplish this the backrest includes a frame and a back plate spaced from the frame, the frame being provided with a webbing of plastic or fibrous material. By spacing the webbing from the back plate, air has a chance to circulate in behind the back of the occupant.

Yet another object of this invention is to provide a backrest including a back plate to conform to the contour of the back cushion of the seat and a webbing to conform to the contour of the driver or occupant's back.

Yet another object of this invention is to provide a backrest of the character described which eliminates the vacant space between the bottom cushion and the back cushion of the seat and gives the proper support to the driver or occupant.

These together with various ancillary objects and features of the invention which will later become apparent as the following description proceeds, are attained by the device, a preferred embodiment of which has been illustrated by way of example only in the accompanying drawings, wherein:

Figure 1 is a perspective view of the backrest positioned upon a seat in an automotive vehicle;

Figure 2 is a longitudinal sectional view taken substantially on the plane of section line 2—2 of Figure 1;

Figure 3 is a transverse sectional view taken substantially on the plane of section line 3—3 of Figure 2;

Figure 4 is an elevational view of the bottom plate;

Figure 5 is a perspective view of one of the spacer blocks.

Specific reference is now made to the drawings. In the several views in the accompanying drawings and in the following specification reference characters indicate corresponding elements throughout.

Indicated generally at 10 is the back arcuated cushion of a seat 12, said seat including a base cushion 14. The backrest includes a frame 16 having a pair of spaced vertically extending dowels or uprights 18 and 20 which are provided with suitable recesses or apertures adjacent the ends thereof for receiving arcuated dowels or rods 20 and 22 interconnecting the uprights 16 and 18. A cross webbing 24 of suitable plastic or fibrous material is stretched on the frame and attached as by adhesion or tacks to the dowels 16, 18, 20 and 22. The horizontal dowels 20 and 22 are arcuated to conform as closely as possible to the contour of the occupant's back.

A back plate 26 is provided which as shown clearly in the drawings is arcuated to conform to the contour of the back cushion 10 and glued or otherwise secured to the back plate 26 is a pair of preferably arcuated vertically extending rods or dowels 28 and 30 and a horizontally extending dowel or rod 32 adjacent the top edge of the plate. Secured to the bottom edge of the back plate 26 as by gluing or any other fastening means is a bottom plate 34 which has a forward arcuate edge 36 and extensions 38 and 40 upon which the bottoms of the uprights 16 and 18 rest.

The frame 16 and associated webbing 24 is supported upon the bottom plate 34 and the back plate 26 in spaced relationship to the back plate by means of a plurality of spacer blocks. As will be seen clearly in Figure 5, two spacer blocks 42 are provided for positioning on the bottom plate 34 intermediate the bottom portions of the uprights 18 and 20 and the vertical rods 28 and 30 respectively. These spacer blocks are substantially rectangular in construction and include arcuated recesses 44 and 46 in opposite side faces thereof for receiving the dowels 18 and 28 in one case and dowels 20 and 30 in the other case. A pair of similar spacer blocks 48 and 50 are provided adjacent the top edge of the frame which spacer blocks are substantially the same in construction as blocks 42 except that the rear edge of each of the blocks 48 and 50 is further provided with a transversely extending arcuated recess 52 for receiving the horizontally extending dowel 32 carried by the plate 26.

To lend rigidity to the entire backrest a further horizontally extending dowel 54 may be provided at the bottom of the back plate 26 similar in shape and construction to the top dowel 32. If such a rod is employed in the construction, it will be understood that the spacer blocks 42 and 44 will also be provided with transversely extending arcuated recesses 56 similar to the recesses 52 in the spacer blocks 48 and 50 for receiving the horizontal dowel or rod 54.

It will be seen that a novel backrest is provided which is easily assembled, rigidly constructed, and extremely useful for relieving the driver of an automotive vehicle.

In view of the foregoing description taken in conjunction with the accompanying drawings it is believed that a clear under standing of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A backrest for a seat in an automotive vehicle comprising a back plate arcuated to conform to the contour of the back seat, a relatively narrow bottom plate secured to the back plate, frame members, means for supporting said frame members in spaced relation to said back plate, and crossed webs carried by said frame members, said frame members including a pair of uprights supported upon said bottom plate and spaced horizontal arcuated rods interconnecting said uprights adjacent their ends.

2. The combination of claim 1 wherein said means includes spacer blocks interposed between said uprights and said back plate.

3. The combination of claim 2 and a pair of vertical rods secured to said back plate.

4. The combination of claim 3 wherein each of said spacer blocks include arcuate recesses in opposite faces for receiving one of said uprights and a corresponding one of said vertical rods.

5. The combination of claim 4 wherein four spacer blocks are provided, two for engaging said uprights and said vertical rods adjacent their upper ends and two for engaging said uprights and vertical rods at their lower ends, the latter two being secured to said bottom plate.

FRANK E. VEALE.

REFERENCES CITED

The following references are of record in the file of this patent:

UNITED STATES PATENTS

| Number    | Name   | Date          |
|-----------|--------|---------------|
| 1,356,493 | Kerr   | Oct. 19, 1920 |
| 1,530,544 | Cooper | Mar. 24, 1925 |